Jan. 27, 1942.                C. L. HALL                2,271,495
            SNAP FASTENER AND SNAP FASTENER INSTALLATION
                         Filed May 17, 1939
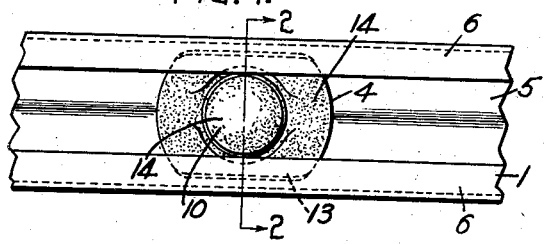
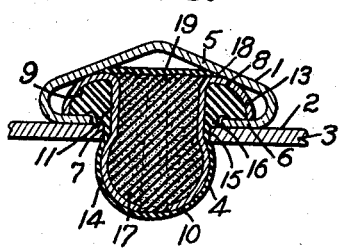
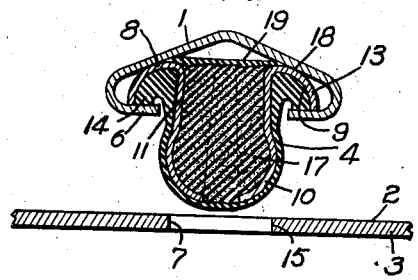
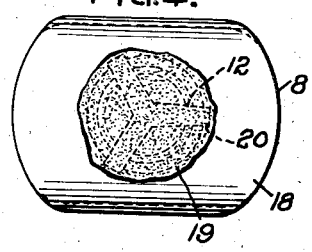
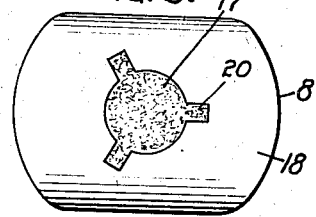
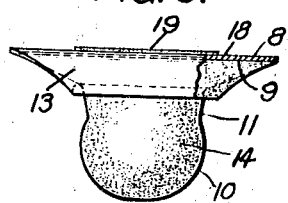
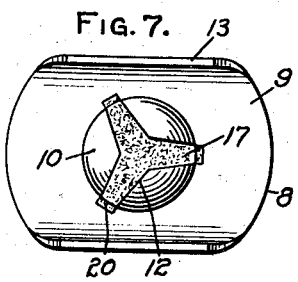
INVENTOR
CHARLES L. HALL
by John Jodd   Att'y Patented Jan. 27, 1942

2,271,495

UNITED STATES PATENT OFFICE 2,271,495

SNAP FASTENER AND SNAP FASTENER INSTALLATION

Charles L. Hall, Detroit, Mich., assignor to United-Carr Fastener Corporation, Cambridge, Mass., a corporation of Massachusetts Application May 17, 1939, Serial No. 274,206

7 Claims. (Cl. 24—73)

This invention relates to improvements in fastener members particularly of the type used for securing one part to another part and to installations of the same.

One object of my invention is the provision of a fastener stud member of the type having a flange or base and a hollow boss pressed from the base and slotted to provide a contractible and expansible socket-engaging means wherein flexible non-metallic material such as latex, sponge rubber or the like overlie the slot or slots to prevent the passage of water, air, dust, or other foreign matter therethrough.

Another object of my invention is the provision of a fastener member having a flange or base portion adapted for assembly with a part to be supported and a stud head and neck extending from the base for snap fastener engagement with a support through an aperture of the support so as to secure the parts of the installation together and means such as latex rubber encircling the outer surface of the stud adjacent the aperture of the support in a way to seal the aperture to prevent the passage of foreign matter through the aperture between the outer surface of the stud and the walls of the aperture.

My invention is particularly useful in installations wherein a molding strip or the like, now commonly used for ornamenting the exteriors of automobiles, are secured to the body of the automobile due to the fact that it is impossible for water, wind or dust to enter the interior of the automobile through the fastener member or the fastener-receiving opening of the body.

Referring to the drawing, in which I have illustrated preferred embodiments of my invention:

Fig. 1 is a bottom plan view showing a molding strip with one of my improved fastener members assembled therewith;

Fig. 2 is a sectional view of my preferred installation showing a molding strip with one of my fastener members assembled therewith in position prior to fastener engagement thereof with a support;

Fig. 3 is a sectional view of the installation shown in Fig. 2 with the parts thereof in final fastened assembly;

Fig. 4 is a top plan view of the fastener member shown in Fig. 3;

Fig. 5 is a front view partly in section of the fastener shown in Fig. 3;

Fig. 6 is a top plan view of a modified form of my improved fastener member; and Fig. 7 is a bottom plan view of the fastener member shown in Fig. 6.

Referring to the preferred installation of my invention illustrated in the drawing, I have shown a part to be supported, such as a molding strip 1, secured to the outer surface 2 of a support 3 by a fastener stud member 4. The molding strip 1 is of the type now commonly used to ornament the exteriors of automobiles and provides an arched top side 5 and flange portions 6 extending inwardly from longitudinal edges of the top side 5. The flanges 6 are spaced one from another at their longitudinal free edges and form the bottom side of the molding. The support 3, which is preferably the body of an automobile, has a circular opening 7 for receiving a contractible and expansible head of the fastener member 4.

Referring in detail to my improved fastener member 4, I have shown one made from one piece of sheet metal having a flange or base portion 8 at one end. A hollow boss is pressed from the base 8 and extends from the outer surface 9 thereof providing a stud head 10 and a neck 11. A plurality of slots 12 extend from the outer end of the head 10 in my preferred form through the neck 11 and into the base 8 rendering the head and neck contractible and expansible for snap fastener engagement with the support 3 through the aperture 7. Flange portions 13 extend from opposed marginal edges of the base 8 in the direction of the stud head 10 and not only effect tight assembly of the base 8 within the molding 1, but also give a substantially hollow or cup-like shape to the base so as to aid the attachment of a flexible non-metallic covering to the outer surface thereof, as will be hereinafter more fully described.

Having reference to my first form of stud member illustrated in Figs. 1 through 5, I have shown one wherein the slots 12 are covered by a flexible non-metallic material on opposite sides of the fastener. It should be understood, however, that I do not wish to be limited by this construction in view of the fact that the fastener member may be capable of effecting the desired object should the slots 12 be covered on one side only of the fastener.

Referring in detail to the fastener member shown in Figs. 1-6, the outer surface 9 of the base 8 and the outer surface of the stud head 10 and neck 11 have a covering 14 of flexible non-metallic material which is preferably applied by dipping the fastener into the liquid latex. I prefer a covering for the outer surfaces of the fastener formed of liquid latex rather than molded rubber as the latex can be put on more economically and effects a more resilient coating for a purpose hereinafter described. It will be seen that the covering 14 may be thickest adjacent the outer surface 9 of the base 8 and may diminish progressively in thickness from the base 8 to the outer end of the head 10. The covering 14 completely overlies the slots 12 so as to prevent the passage of water, air or the like through the slots 12 from either one of the inner or outer surfaces of the fastener to the other. At the same time it will be seen from inspection of Figs. 2 and 3 that when the stud head 10 is inserted through the aperture 7 of the support, engagement of the walls 15 of the aperture with the covering 14 tends to stretch the covering in the direction of the base 8 increasing the thickness of the covering at points 16 (Fig. 3) around the neck 11 adjacent the upper surface 2 of the support so as to effect a seal which prevents the passage of foreign matter through the opening 7 between the outer surface of the fastener member and the walls 15.

In addition, an insert or plug 17 of resilient non-metallic material, such as sponge rubber, may be inserted into the interior of the boss 4 from a position outside the inner surface 18 of the base 8 so as to overlie the slots 12 adjacent the inner surfaces of the stud head and neck. A covering of liquid latex 19 may be applied to the end of the plug 17 adjacent the inner surface 18 of the base 8 so as to overlie those portions 20 of the slots 12 which extend into the base 8 thus completely sealing all openings in the fastener.

In Fig. 6 I have shown a fastener member which is similar in form to the fastener member illustrated in Figs. 1-5, but with which I have chosen to employ the plug or insert 17 as the sole means for sealing the slots 12 against the passage of foreign matter therethrough. Thus I have found that the fastener is capable of satisfactory operation for the desired purposes by employing the plug 17 alone for sealing the openings. Furthermore, it is understood that the fastener member would work successfully should the plug 17 and covering 19 be omitted and the outer covering 14 provide the sole means for sealing the openings in the fastener and any space between the fastener and the walls 15 surrounding the aperture 7 of the support when the parts of the installation are in final assembly.

It will be seen, therefore, from inspection of Fig. 2 that when the molding 1 is secured to the base it is impossible for elements such as wind and water or foreign matter such as dust or dirt to enter into the interior of the automobile through the openings of the fastener member or through the opening of the support through which the stud and head of the fastener extend.

Although I have illustrated and described preferred embodiments of my invention, I do not wish to be limited thereby because the scope of my invention is best set forth in the following claims.

I claim:

1. A snap fastener member comprising a base portion and a slotted stud head and neck extending from said base portion for snap fastener engagement with a support through an aperture thereof, and said head and neck having a covering of flexible material to exclude passage of foreign matter through the slotted head and neck.

2. A fastener stud member comprising a base portion and a stud head and neck extending from said base portion for fastener engagement with a support through an aperture thereof, said stud member being formed from metal having at least one slot extending from said head into the base of said stud to permit contraction of said head, and the outer surface of said base, head and neck having a covering of resilient material of the nature of latex rubber so as to overlie said slot and exclude foreign matter from passing through said fastener.

3. A fastener stud member comprising a base having a hollow boss extending from the outer surface thereof providing a stud head and neck for fastener engagement with a support through an aperture thereof, said stud member having at least one slot extending from said head through said neck and into said base, a plug of flexible material disposed within said hollow boss and the inner surface of said base having a covering of material of the nature of latex rubber so as to overlie the portion of said slot in said base, said plug and said covering combining to prevent the passage of foreign matter through said slot.

4. A fastener stud member comprising a base having a hollow boss extending from the outer surface thereof providing a stud head and neck for fastener engagement with a support through an aperture thereof, said stud member having at least one slot extending from said head through said neck and into said base to permit contraction of said head, the outer surface of said base, head and neck having a covering of resilient material so as to overlie said slot, a plug of flexible material disposed within said hollow boss so as to overlie said slot at the inner surface of said head and boss and the inner surface of said base having a covering of material so as to overlie said portion of said slot in said base, said plug and said coverings combining to prevent the passage of foreign matter through said slot.

5. A waterproof fastener installation comprising a support having an aperture, a snap member to be secured to said support and a fastener stud member for securing said parts together, said stud member having a base in assembled engagement with said member and a stud head and neck extending from said base through said aperture of said support to engage said head behind said support, said stud member having a slot extending from said head into said neck to a point beyond the opposite side of said support from said head to permit contraction of said head, and said fastener having means of flexible material overlying said slot to prevent passage of water or other foreign matter from one side of said support through said slot of said fastener to the other side of said support.

6. A waterproof fastener installation comprising a support having an aperture, a member to be secured to said support and a fastener stud member for securing said parts together, said stud member having a base in assembled engagement with said member and a stud head and neck extending from said base through said aperture of said support to engage said head behind said support, said stud member having a slot extending from said head into said base to permit contraction of said head, and the outer surface of said fastener having a flexible covering of material such as latex rubber so as to overlie said slot to prevent passage of water or other foreign matter from one side of said support through said slot of said fastener to the other side of said support.

7. A waterproof fastener installation comprising a support having an aperture, a member to be secured to said support and a metallic fastener stud member for securing said parts together, said stud member having a base in engagement with said member and a contractible and expansible portion providing a stud head and neck extending from said base through said aperture of said support to engage said head behind said support, said portion having separation spaces to permit contraction and expansion, and flexible means such as rubber forming a part of the fastener and closing said spaces to prevent passage of water, dust and the like through the said portion for the purpose described.

CHARLES L. HALL.